(12) United States Patent  
Funk et al.

(10) Patent No.: US 8,904,145 B2  
(45) Date of Patent: Dec. 2, 2014

(54) ADJUSTING MEMORY ALLOCATION OF A PARTITION USING COMPRESSED MEMORY PAGING STATISTICS

(75) Inventors: Mark R. Funk, Mantorville, MN (US); Vernon R. Pahl, Pine Island, MN (US); Ronald D. Young, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 12/894,666

(22) Filed: Sep. 30, 2010

(65) Prior Publication Data

US 2012/0084531 A1 Apr. 5, 2012

(51) Int. Cl.
- *G06F 12/00* (2006.01)
- *G06F 13/00* (2006.01)
- *G06F 13/28* (2006.01)
- *G06F 12/02* (2006.01)

(52) U.S. Cl.  
CPC ...... *G06F 12/0223* (2013.01); *G06F 2212/401* (2013.01)  
USPC ............ 711/173; 711/170; 711/171; 711/172

(58) Field of Classification Search  
None  
See application file for complete search history.

(56) References Cited

U.S. PATENT DOCUMENTS

| | | | |
|---|---|---|---|
| 5,729,228 A | 3/1998 | Franaszek et al. | |
| 7,587,572 B1 * | 9/2009 | Stenstrom | 711/173 |
| 8,447,948 B1 * | 5/2013 | Erdogan et al. | 711/173 |
| 2001/0001872 A1 * | 5/2001 | Singh et al. | 711/129 |
| 2007/0143558 A1 | 6/2007 | Tseytin | |
| 2008/0307188 A1 | 12/2008 | Franaszek et al. | |
| 2009/0112949 A1 * | 4/2009 | Ergan et al. | 707/205 |
| 2009/0228660 A1 * | 9/2009 | Edwards et al. | 711/133 |

* cited by examiner

*Primary Examiner* — Yaima Rigol  
(74) *Attorney, Agent, or Firm* — Heslin Rothenberg Farley & Mesiti, PC (57) ABSTRACT

Acceptable memory allocation for a partition is determined during and with minimal impact on normal operation of the partitioned system. The approach includes: collecting, by a processor, statistics on a rate at which pages are transferred between uncompressed and compressed memory spaces of the partition's memory; adjusting size of the uncompressed memory space; and subsequent to the adjusting, continuing with collecting of the statistics, and referencing the resultant statistics in determining an acceptable memory allocation for the partition. In one implementation, the adjusting includes stepwise decreasing size of the uncompressed memory space by reallocating uncompressed memory space to compressed memory space, and repeating the collecting of statistics for a defined measurement period for each adjusted uncompressed memory space size until performance of the partition is negatively impacted by the reallocation of uncompressed memory space to compressed memory space.

21 Claims, 5 Drawing Sheets

ADJUSTING MEMORY ALLOCATION OF A PARTITION USING COMPRESSED MEMORY PAGING STATISTICS

BACKGROUND

With the high cost of memory in, for example, server computer systems, and with the ever-increasing number of processor cores which can be attached to that memory, determining how much memory is enough memory is a significant issue. The typical answer is to look at paging rates between main memory and external storage, and workload response times. If the paging rates between main memory and external storage are high, and response times are unacceptable, then the answer is often to purchase additional memory.

Increasingly though, server computer systems are partitioned with a plurality of logical partitions, such that a single central electronic complex and its main memory may support multiple instances of operating systems. For a given amount (or even for some maximum amount) of memory of the system, it becomes the system administrator's responsibility to determine how much of the physical memory should be assigned to each partition of the partitioned computer system. Similarly, as additional partitions are added, either still-more physical memory needs to be added, or existing partitions need to donate a portion of their memory to the new partitions. Therefore, a need exists for a tool for facilitating determining how much memory each partition requires, and for identifying when the partition requires that memory. Ideally, this determination would be made without unduly impacting performance of the computer system.

BRIEF SUMMARY

Provided herein, in one aspect, is a method of adjusting memory allocation of a partition in a partitioned data processing system. The method includes: collecting, by a processor, statistics on a rate at which pages are transferred between an uncompressed memory space and a compressed memory space of the partition's memory, wherein uncompressed pages are stored in the uncompressed memory space and compressed pages are stored in the compressed memory space; adjusting size of the uncompressed memory space of the partition's memory; and subsequent to the adjusting, continuing with collecting of the statistics, and referencing the resulting statistics in determining an acceptable memory allocation for the partition.

In another aspect, a system is provided for adjusting memory allocation of a partition in a partitioned data processing system. The system includes: a memory; and a processor in communications with the memory, wherein the system is configured to perform: collecting, by the processor, statistics on a rate at which pages are transferred between an uncompressed memory space and a compressed memory space of the partition's memory, wherein uncompressed pages are stored in the uncompressed memory space and compressed pages are stored in the compressed memory space; adjusting size of the uncompressed memory space of the partition's memory; and subsequent to the adjusting, continuing with collecting of the statistics, wherein the resulting statistics facilitate determining whether an acceptable memory allocation for the partition has been achieved.

In a further aspect, a computer program product is provided for facilitating adjusting memory allocation of a partition in a partitioned data processing system. The computer program product includes a computer-readable storage medium readable by a processor and storing instructions for execution by the processor for performing: collecting, by the processor, statistics on a rate at which pages are transferred between an uncompressed memory space and a compressed memory space of the partition's memory, wherein uncompressed pages are stored in the uncompressed memory space and compressed pages are stored in the compressed memory space; adjusting size of the uncompressed memory space of the partition's memory; and subsequent to the adjusting, continuing with collecting of the statistics, wherein the resulting statistics facilitate determining whether an acceptable memory allocation for the partition has been achieved.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a tool is provided for facilitating determining an acceptable memory allocation for a partition of a partitioned data processing system. In one aspect, memory allocation of the partition is evaluated by collecting statistics on the rate at which pages are transferred between uncompressed and compressed memory spaces of the partition's memory. The size of the uncompressed memory space is stepwise adjusted, and subsequent to each adjustment, additional statistics are collected on the rate at which pages are transferred between the uncompressed and compressed memory spaces. Advantageously, the resulting statistics facilitate identifying an acceptable or desired memory allocation for the partition.

More particularly, subsequent to stepwise adjusting the size of the uncompressed memory space, and collecting of compressed memory paging statistics while using the system in representative ways (and with minimal impact on performance due to the existence of still in-memory compressed pages), a system administrator can use the resulting paging statistics to determine how much memory a partition requires. Advantageously, the presence of the compressed memory provides rapid access to what would have conventionally been pages in external memory if the compressed memory space did not exist. In accordance with aspects of the invention disclosed herein, the amount of uncompressed memory space is stressed, and the compressed memory accesses are counted (which would have been accesses to external memory if not for the presence of the compressed memory space). From this information, it is determined how much memory would be needed if the accesses were to the slower external memory. Advantageously, this is accomplished without significantly impacting performance to the user due to the existence of the still in-memory compressed pages. One skilled in the art will note that a further customer-usable tool would reuse the resulting statistics to factor in the expected external storage latencies, and user specified number of "transactions" (and from there the input/outputs per transaction), which would provide customer-understandable feedback on performance issues such as response times.

One embodiment of a processing system 100 to incorporate and use one or more aspects of the present invention is described below with reference to FIG. 1. As one example, processing system 100 may be based, for instance, on POWER® servers offered by International Business Machines (IBM®) Corporation, of Armonk, N.Y., and employing an AIX® or i/OS™ operating system, also offered by International Business Machines Corporation. POWER®, IBM®, and AIX® are registered trademarks of International Business Machines Corporation, Armonk, N.Y., U.S.A. Other names used herein may be registered trademarks, trademarks or product names of International Business Machines Corporation or other companies.

In the depicted example, processing system 100 includes a partitioned data processing system 102, such as a partitioned central processor complex (CPC). Partitioned data processing system 102 includes, for instance, one or more partitions or zones 104 (e.g., logical partitions LP1-LPn), one or more central processors 106 (e.g., CP1-CPm), a hypervisor 108 (e.g., a logical partition manager), a physical memory 107 and external storage 120, each of which is described below.

Each logical partition 104 is capable of functioning as a separate system. That is, each logical partition can be independently reset, initially loaded with an operating system or a hypervisor, if desired, and operate with different programs. An operating system, a hypervisor, or an application program running in a logical partition appears to have access to a full and complete system, but only a portion of it is actually available. A combination of hardware and Licensed Internal Code (also referred to as microcode or millicode) keeps a program in a logical partition from interfering with a program in a different logical partition. This allows several different logical partitions to operate on a single or multiple physical processors in a time sliced manner. In this particular example, each logical partition has a resident operating system 110 (and/or a resident hypervisor), which may differ for one or more logical partitions. In one embodiment, operating system 110 is an AIX® or i/OS™ operating system, offered by International Business Machines Corporation, Armonk, N.Y.

Central processors 106 and physical memory 107 are physical processor and memory resources that are allocated to the logical partitions. For instance, a logical partition 104 includes one or more logical processors, each of which represents all or a share of a physical processor resource 106 allocated to the partition. The underlying memory and processor resources may either be dedicated to that partition or shared with another partition.

Logical partitions 104 are managed by hypervisor 108 implemented by firmware running on processors 106. Logical partitions 104 and hypervisor 108 each comprise one or more programs residing in respective portions of physical memory 107 associated with the central processors. One example of hypervisor 108 is the Processor Resource/Systems Manager (PR/SM), offered by International Business Machines Corporation, Armonk, N.Y.

External storage 120 provides auxiliary data storage separate from physical memory 107 (i.e., main memory), of the processing system. As one example, external storage 120 comprises a Direct Access Storage Device (DASD), which includes, in a memory hierarchy, a DASD adapter storage cache and the disk drive proper. Thus, the memory hierarchy for processing system 100 is processor cache, physical memory, and external storage, including, for example, DASD adapter storage cache and the disk drive proper. Conventionally, data in main memory is stored in uncompressed pages. The pages form virtual memory units (or regions) ranging from a few kilobytes up to several megabytes in size.

A relatively recent development in computer organization is the use of data compression for contents of a portion of physical memory, that is, that portion of the random access memory hierarchy that is managed by the operating system, and where the unit of allocation is a page. A convenient approach to performing this compression is by automatically compressing data using special purpose hardware, with a minimum of intervention by software or the operating system. This permits compression/decompression to be done rapidly.

In compressed memory systems, a page may occupy a variable amount of physical memory space, that is, pages occupy or share a variable number of fixed-sized blocks. For example, a page may be of nominal 4K size, and blocks may be 256 bytes in size. Generally, the number of such blocks occupied by a compressed page will vary with its contents, due to changes in compressibility.

A cache line may be compressed prior to being written into compressed memory space using a standard sequential or a parallel compression algorithm. Examples of sequential compression include Lempl-Ziv coding (and its sequential and parallel variations), Huffman coating and arithmetic coating. Parallel compression approaches are also described in the literature. For example, a parallel approach is presented in U.S. Pat. No. 5,729,228, entitled "Parallel Compression and Decompression Using a Cooperative Dictionary", by Franaszek et al. Advantageously, memory compression operates to increase the capacity of main store, yet operates transparent to the software.

Figure 1:
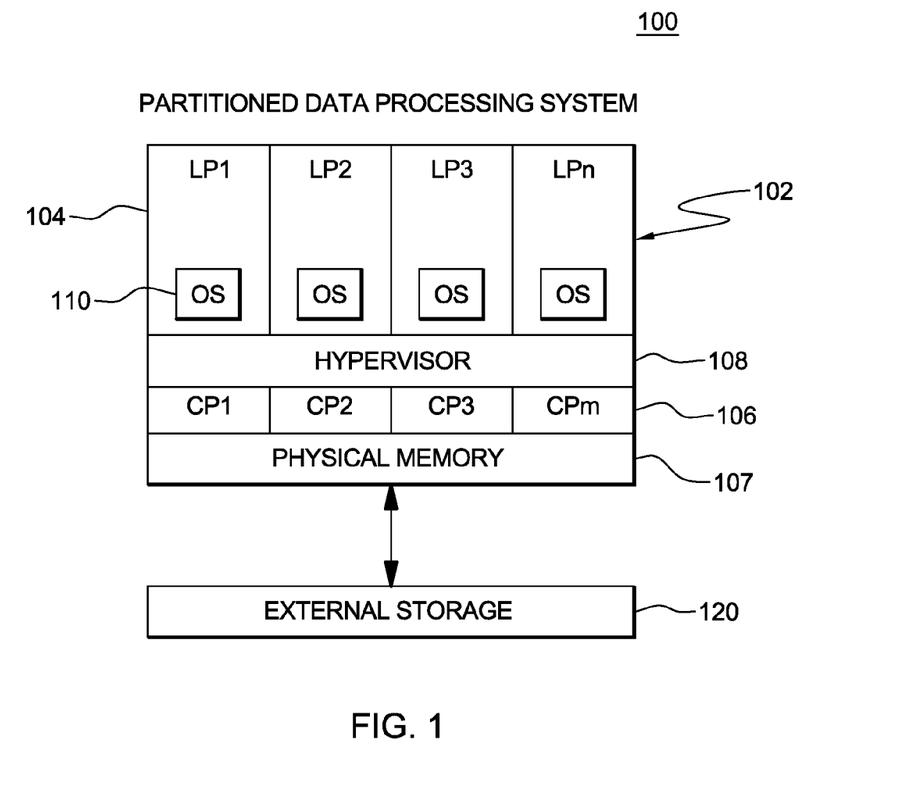
FIG. 1 is a block diagram of one embodiment of a partitioned data processing system to employ a tool for facilitating adjusting memory allocation of a partition, in accordance with an aspect of the present invention.
Figure 2:
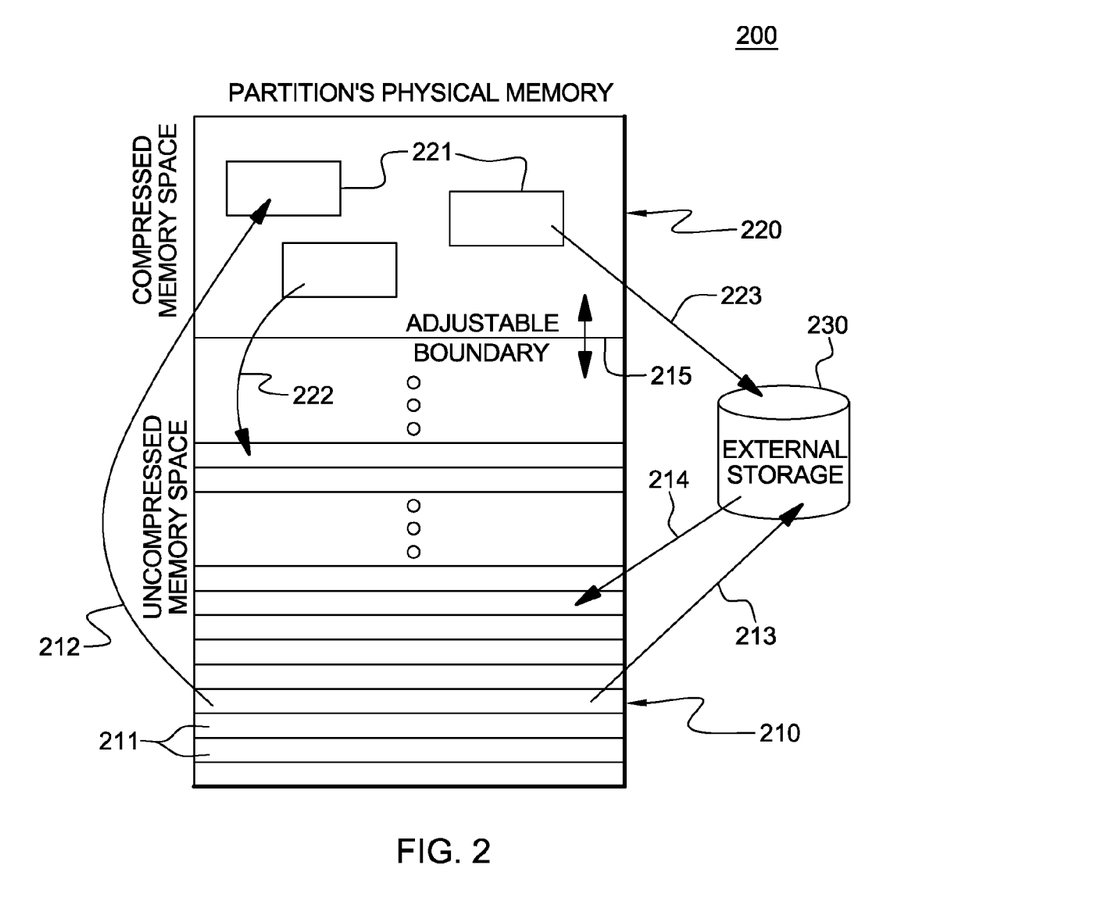
FIG. 2 illustrates a partition's physical memory divided into uncompressed memory space and compressed memory space, and further illustrating transfer of pages between the uncompressed and compressed memory spaces, as well as between the partition's physical memory and external storage, in accordance with an aspect of the present invention.

FIG. 2 depicts one embodiment of the memory hierarchy for a partition within a processing system, such as depicted in FIG. 1. In this example, the partition's physical memory 200 is divided into an uncompressed memory space 210 (containing uncompressed pages 211) and a compressed memory space 220 (containing compressed pages 221), with an adjustable boundary 215 illustrated between the two spaces. With memory compression, or more specifically, page compression, the operating system maintains a pool of storage which holds the compressed state of pages. As the contents of physical pages 211 are found to be of lower use, they would typically be marked as available for reuse, subsequently invalidated, and then the physical page would be reused to hold the contents of a different virtual page. However, with a memory compression implementation, the contents of this aged and subsequently invalidated page are instead first compressed 212 in size, while still representing the same information, and copied into the compressed memory space 220. In the event the aged virtual page is subsequently reused, it can be quickly decompressed 222 and restored to the uncompressed memory space 210. This advantageously avoids the rather long latency of having to retrieve the page 214 from an external storage 230 (such as a direct access storage device). What this means is that the compressed memory space 220 has the effect of providing a new level of storage hierarchy. In terms of latency and access, the hierarchy would be as follows:

1. Processor cache
2. Main storage (uncompressed memory space 210)
3. Main storage (compressed memory space 220)
4. External storage 230 cache (e.g., DASD adapter storage cache)
5. External storage proper (e.g., disk drive proper).

A page 221 residing in compressed memory space 220 will appear as a "page fault", as would a page residing in external storage 230, but the latency to restore such a page to be accessible is largely the length of time it takes to decompress the page 222. Pages which are changed, and which must be written to disk 213, are written from their original, uncompressed state. Once these pages have been written to persistent storage (e.g., DASD controllers, NVRAM or disk proper), the pages are considered unchanged and can be compressed and placed into the compressed memory space 220. Changed pages which are essentially aged, have the option of being either stored to external storage 230 before being compressed, or of being held in a changed state in the compressed memory space. Once such changed compressed pages are aged out of the compressed memory space, they would then have their contents 223 written to external storage 230.

As noted, disclosed herein is a tool for adjusting memory allocation of a partition in a partitioned data processing system. The tool employs the notion of the uncompressed and compressed memory space within the partition's physical memory, along with the collection of time-based statistics on the rate at which pages are transferred between uncompressed and compressed (physical) memory space. The resulting statistics are then referenced to facilitate determining the logical partition's appropriate memory size, all while still maintaining acceptable metrics of performance for the processing system. After stepwise adjusting size of the uncompressed memory space, and collecting of compressed memory paging statistics while using the system in representative ways (and with minimal impact on performance due to the existence of still in-memory compressed pages), a system administrator can use the resulting paging statistics to determine just how much memory the partition requires.

Figure 3:
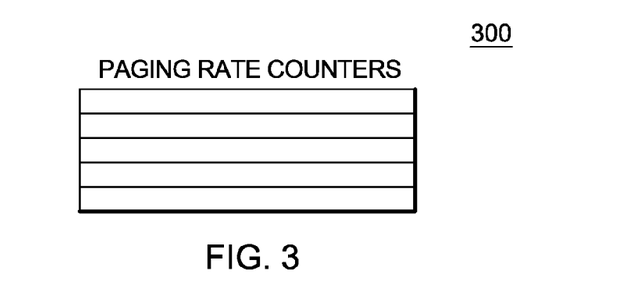
FIG. 3 depicts paging rate counters employed in collecting statistics on rates at which pages are transferred between uncompressed and compressed memory spaces of a partition's physical memory, as well as rates at which pages are transferred between the partition's physical memory and external storage, in accordance with an aspect of the present invention.

FIG. 3 illustrates paging rate counters 300, which are employed in collecting, by a processor (for each uncompressed memory space allocation), statistics on the rate at which pages are transferred between uncompressed memory space and compressed memory space, as well as the rate at which pages are read from external storage or written to external storage. Once an acceptable or desired uncompressed memory space allocation is ascertained for a partition, the memory assigned to that partition of the processing system (as well as the other partitions of the system) can be dynamically set using, for example, Dynamic LPAR, available on POWER®-based servers, and supported by the AIX® and i/OS™ operating systems, offered by International Business Machines Corporation.

Figure 4:
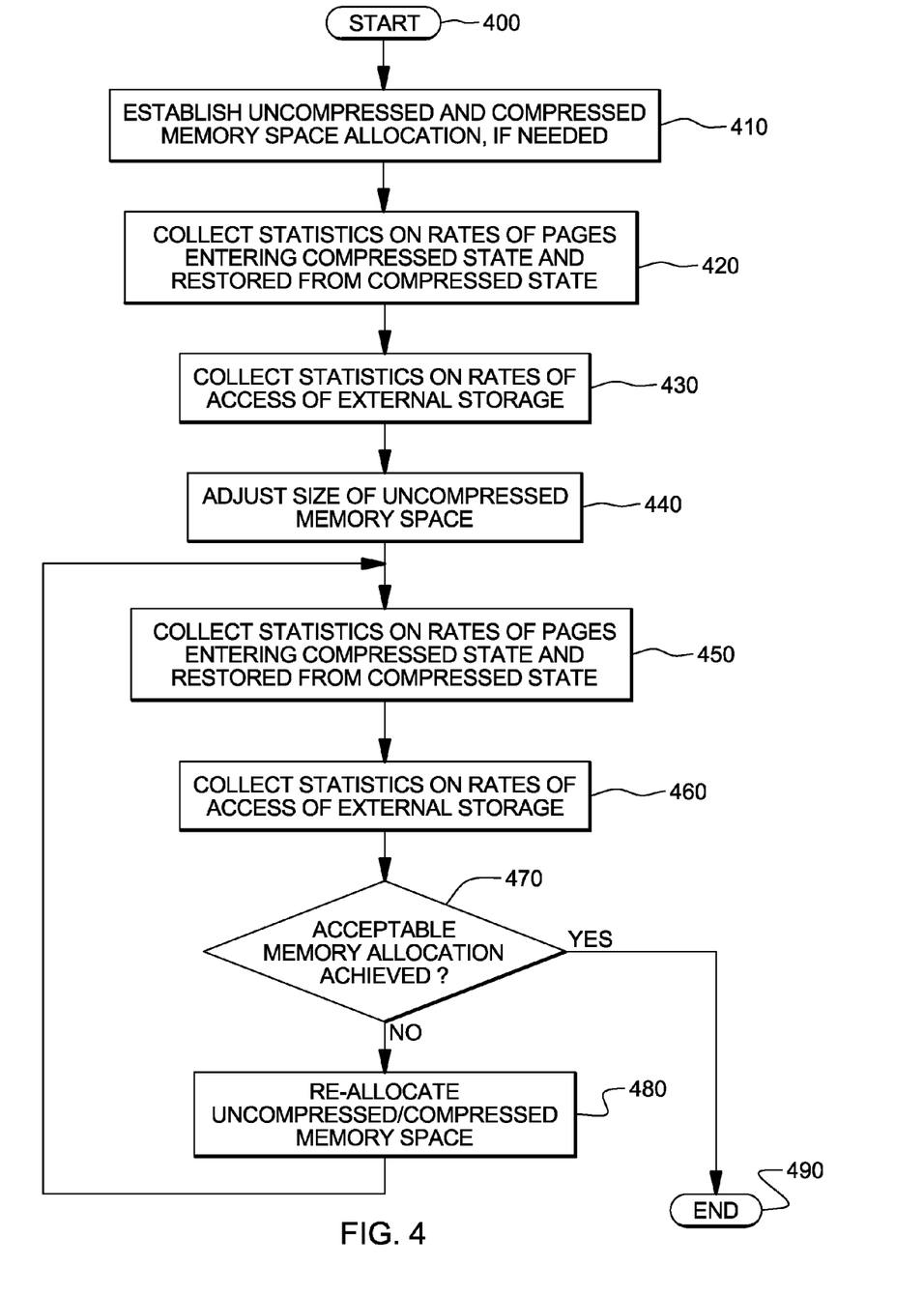
FIG. 4 depicts one embodiment of a process for adjusting memory allocation of a partition in a partitioned data processing system, in accordance with an aspect of the present invention.

FIG. 4 illustrates one embodiment of a process for adjusting memory allocation of a partition in a partitioned data processing system, in accordance with an aspect of the present invention. Processing starts 400 with establishing (if not already established) uncompressed and compressed memory spaces from the partition's physical memory 410. In one implementation, this capability is provided to a system administrator via "Active Memory Expansion". Active Memory Expansion is a POWER®-based server technology, offered by International Business Machines Corporation, that allows the effective maximum main memory capacity to be, for example, up to 100% larger than the true physical memory maximum for an AIX® partition. Active Memory Expansion relies on compression of in-memory data to increase the amount of data that can be placed into memory, and thus expand the effective memory capacity of, for example, a POWER® 7 system (offered by International Business Machines Corporation). The in-memory data compression is managed by the system, and this compression is transparent to applications and users. Active Memory Expansion is configurable on a per-logical partition (LPAR) basis. Thus, Active Memory Expansion can be selectively enabled for one or more partitions of a system. When Active Memory Expansion is enabled for a partition, the operating system will compress a portion of the LPAR's memory, and leave the remaining portion of memory uncompressed. This results in the partition's physical memory effectively being broken up into two pools, that is, a compressed memory space and an uncompressed memory space. Active Memory Expansion further allows for the boundary between the compressed memory space and uncompressed memory space to be adjusted.

In one approach, the system administrator will initially set the number of uncompressed pages to be only slightly fewer than the number of uncompressed pages before the split. As noted above, pages aging out of the uncompressed memory space are compressed and placed into the compressed memory space. For this configuration, the rate of pages entering the compressed state and the rate of pages being restored from the compressed state are measured, and a periodic history of this activity is maintained 420. In addition, the rates of reads and writes from and to external storage are also maintained 430. The measurement period selected for collecting these paging statistics for each uncompressed memory space size is chosen to be sufficient to have encompassed processing of the workloads of interest. Note that this adjusting of the memory and collecting of statistics occurs while the processing system remains operational, and occurs with minimal impact on the normal operation of the partitioned data processing system (due to the changes principally being to the compressed memory paging rates).

The next step is to adjust the size of the uncompressed memory space further 440. In one example, the size of the uncompressed memory space is decreased by decreasing the number of uncompressed pages by some percentage, moving the lost physical storage to the compressed memory space. Statistics are then collected on the rate pages in the partition's memory enter the compressed state and the rate pages are restored from the compressed state 450, along with statistics on the rates of access to external storage 460. Processing then determines whether further stepwise adjustment of the uncompressed memory space size is desired, that is, whether an acceptable memory allocation has been achieved 470. If "no", then additional uncompressed memory space is reallocated to compressed memory space 480, and additional statistics are collected based on the reallocated memory configuration. Once acceptable memory allocation has been achieved, processing completes 490.

Notice that the increase in the rate at which pages are written into the compressed memory space is a representation of the increased rate at which pages would have been lost from the partition's main memory due to the smaller, uncompressed memory space (i.e., smaller, uncompressed page count). Perhaps more significantly, the increase in the rate at which pages are restored from the compressed memory space also represents the rate at which lost pages would have needed to have been restored from external storage if there had been no compressed memory space. This point is significant. The compressed memory space is essentially providing statistics on the rates of paging, without most of the overhead of actually doing paging to and from external storage.

Up to a point, a significant aspect of page compression is that it allows for more "pages" to remain in main memory, albeit in both uncompressed and compressed states. The number of how many more pages is a function of how well the contents of previously uncompressed pages can be compressed. As a result of using compression, where paging is limiting system capacity, system capacity due to this "increased" number of pages might actually improve. Thus, the count of "reads" both from compressed memory space and from external storage are tracked as the size of the uncompressed memory space is adjusted (e.g., decreased in the example described above). The paging rate should be increasing with the decreasing size of the uncompressed memory space, and the compressed memory space offsets the performance effect of this paging.

Determining an acceptable memory allocation can be based on a number of considerations. If the rate of (re)access of compressed memory space remains minimal over the entire representative test period, then the amount of memory that has been allocated to the partition was already too much. At a minimum, this difference can be provided for use by a new or other partition (or simply banked in the sense of Memory Capacity Upgrade On Demand). For higher levels of "paging", the amount of paging is a function of how the system administrator is using the system. A few multi-millisecond (from external storage) page reads per, for example, OLTP transaction, where many thousands of transactions per second are executing, is generally of minimal concern. But hundreds of such reads per transaction can both unduly impact response time and considerably decrease the opportunity to maintain the partition's many processor cores busy. At the other end of the scale, even with the use of compressed memory space, when the size of the uncompressed memory space becomes too small that performance (e.g., response time) has begun to degrade measurably, this amount of uncompressed memory space is too small to stand alone, and the partition needs additional uncompressed memory space.

Note that the above-described tool also provides a means for clarifying page reuse. Almost by definition, a page (re) read from the compressed memory space is one which is being re-used. If the "normal" uncompressed memory space had been large enough, then the page would have continued to reside within the uncompressed memory space. But as the number of "pages" that can be held in the compressed memory space begins to get quite large, then the total number of pages in main storage exceeds what would normally be available with even still more uncompressed memory space. As such, a large fraction of the pages being read from external storage, statistics for which are also being maintained (as noted above), are also pages that had not been recently read into main memory. These pages would have been read into main memory no matter the size of the main memory. In comparison to statistics taken earlier, one can surmise that this number of pages would have needed to have been read from external storage, no matter the size of the main memory (within reason).

Note that, given the histogram of such paging rates that can be produced as described above, each produced using a different amount of uncompressed memory space, a system administrator can make an educated estimate of just how much memory each partition would require for normal processing needs, as well as for peak processing needs.

Figure 5:
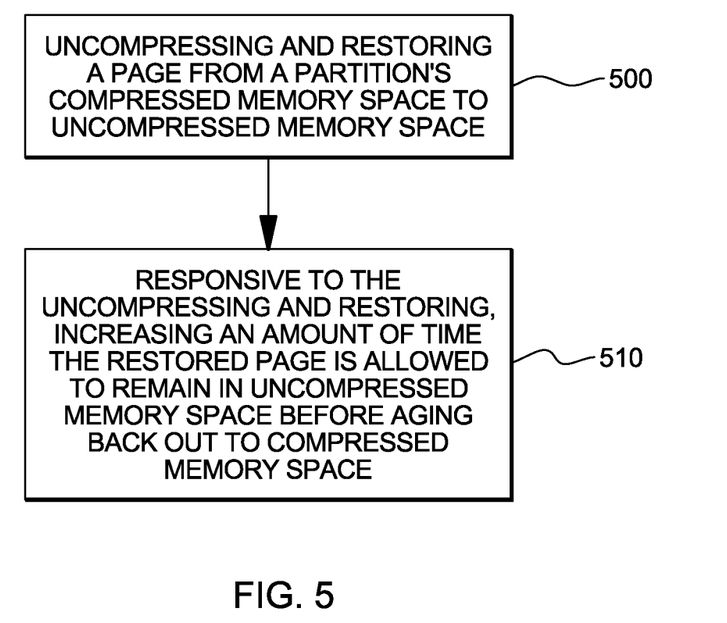
FIG. 5 depicts one embodiment of an internal management process for adjusting the length of time a page remains in uncompressed memory space of a partition's memory, in accordance with an aspect of the present invention.

As described above, the present invention facilitates a system administrator in determining how much main storage is required by a partition. As a further aspect, the same information can be used internally, for the operating system's management of which pages should remain in uncompressed memory space. For example, referring to the process of FIG. 5, a page resurrected from the compressed memory space 500 is likely to also be one which will be used again after a subsequent normal aging process. As such, such a page can be given a slight preference in aging 510. That is, the decompressed page may be aged as before, but allowed to remain in uncompressed memory space slightly longer than is normal for pages not similarly resurrected from the compressed memory space.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
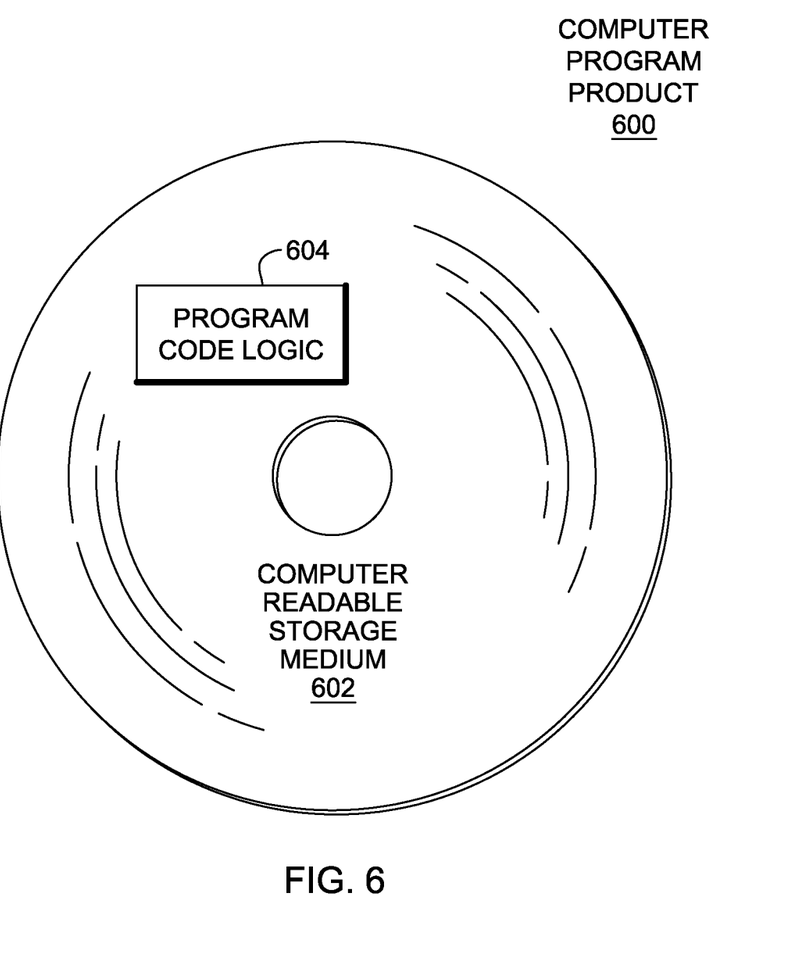
FIG. 6 depicts one embodiment of a computer program product incorporating one or more aspects of the present invention.

Referring now to FIG. 6, in one example, a computer program product 600 includes, for instance, one or more computer readable storage media 602 to store computer readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, other platforms and/or languages can be used without departing from the spirit of the present invention. Aspects of the invention may be performed by tools other than those described herein. Moreover, for certain steps or logic performed by a compiler, other preprocessors or preprocessing logic can be used. Therefore, the term "preprocessor" includes a compiler, any other preprocessor or preprocessor logic, and/or any type of logic that performs similar functions.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of adjusting memory allocation of a partition in a partitioned data processing system, the method comprising:

collecting, by a processor, over a first measurement interval, statistics on a paging rate at which pages are transferred between an uncompressed memory space and a compressed memory space of the partition's main memory, wherein uncompressed pages are stored in the uncompressed memory space and compressed pages are stored in the compressed memory space;

subsequent to the collecting over the first measurement interval, adjusting size of the uncompressed memory space of the partition's main memory; and subsequent to the adjusting, collecting, over a second measurement interval, statistics on the paging rate at which pages are transferred between the uncompressed memory space and the compressed memory space of the partition's main memory, and referencing the resulting measurement interval statistics in determining an acceptable main memory allocation for the partition.

2. The method of claim 1, wherein the collecting over the first measurement interval, the adjusting, and the again collecting over the second measurement interval, occur during and with minimal impact on normal operation of the partitioned data processing system, and wherein the method further comprises using the resulting measurement interval statistics in determining whether to further adjust size of the partition's uncompressed memory space.

3. The method of claim 1, further comprising initially splitting the partition's memory into the uncompressed memory space and the compressed memory space, and wherein a page aging out of the uncompressed memory space is compressed and moved to the compressed memory space.

4. The method of claim 1, wherein the adjusting comprises decreasing the size of the uncompressed memory space by reallocating a portion of uncompressed memory space to compressed memory space.

5. The method of claim 4, further comprising repeating the adjusting and the collecting, over respective measurement intervals, for each adjusted uncompressed memory space size until performance of the partition is negatively impacted by the reallocating of uncompressed memory space to compressed memory space, thereby stressing size of the uncompressed memory space.

6. The method of claim 1, wherein the collecting statistics for the first measurement interval, and the collecting statistics for the second measurement interval, each comprises collecting a paging rate at which pages are compressed for storage in the compressed memory space and a paging rate at which pages are uncompressed and restored from the compressed memory space to the uncompressed memory space.

7. The method of claim 6, wherein the collecting statistics for the first measurement interval, and the collecting statistics for the second measurement interval, each further comprises collecting paging a rate at which pages are read from external storage and a paging rate at which pages are written to external storage, the external storage being external to and separate from the partition's memory.

8. The method of claim 1, further comprising stepwise repeating the adjusting and repeating the collecting, over respective measurement intervals, for each adjusted uncompressed memory space size, and producing therefrom a histogram of paging rates for each adjusted uncompressed memory space size, and using the histograms in establishing an amount of uncompressed memory space needed by the partition during at least one of normal operation or peak operation thereof.

9. A system for facilitating adjusting memory allocation of a partition in a partitioned data processing system, the system comprising:

a memory; and a processor in communications with the memory, wherein the system is configured to perform:

collecting, by a processor, over a first measurement interval statistics on a paging rate at which pages are transferred between an uncompressed memory space and a compressed memory space of the partition's main memory, wherein uncompressed pages are stored in the uncompressed memory space and compressed pages are stored in the compressed memory space;

subsequent to the collecting over the first measurement interval, adjusting size of the uncompressed memory space of the partition's main memory; and subsequent to the adjusting, collecting, over a second measurement interval, statistics on the paging rate at which pages are transferred between the uncompressed memory space and the compressed memory space of the partition's main memory, and referencing the resulting measurement interval statistics in determining an acceptable main memory allocation for the partition.

10. The system of claim 9, wherein the collecting, over the first measurement interval, the adjusting, and the collecting over the second measurement interval, occur during and with minimal impact on normal operation of the partitioned data processing system.

11. The system of claim 9, wherein the system is further configured to perform initially splitting the partition's memory into the uncompressed memory space and the compressed memory space, and wherein a page aging out of the uncompressed memory space is compressed and moved to the compressed memory space.

12. The system of claim 9, wherein the adjusting comprises decreasing the size of the uncompressed memory space by reallocating a portion of uncompressed memory space to compressed memory space.

13. The system of claim 12, further comprising repeating the adjusting and the collecting, over respective measurement intervals, for each adjusted uncompressed memory space size until performance of the partition is negatively impacted by the reallocating of uncompressed memory space to compressed memory space, thereby stressing size of the uncompressed memory space.

14. The system of claim 9, wherein the collecting statistics the first measurement interval, and the collecting statistics for the second measurement interval, each comprises collecting a paging rate at which pages are compressed for storage in the compressed memory space, collecting a paging rate at which pages are uncompressed and restored from the compressed memory space to the uncompressed memory space, collecting a paging rate at which pages are read from external storage, and collecting a paging rate at which pages are written to external storage, the external storage being external to and separate from the partition's memory.

15. The system of claim 9, further comprising stepwise repeating the adjusting and repeating the collecting, over respective measurement intervals, each adjusted uncompressed memory space size, and producing therefrom a histogram of paging rates for each adjusted uncompressed memory space size, and using the histograms in establishing an amount of uncompressed memory space needed by the partition during at least one of normal operation or peak operation thereof.

16. A computer program product for facilitating adjusting memory allocation of a partition in a partitioned data processing system, the computer program product comprising:

a non-transitory computer-readable storage medium, readable by a processor and storing instructions for execution by the processor for performing a method comprising:

collecting, by a processor, over a first measurement interval, statistics on a paging rate at which pages are transferred between an uncompressed memory space and a compressed memory space of the partition's main memory, wherein uncompressed pages are stored in the uncompressed memory space and compressed pages are stored in the compressed memory space;

subsequent to the collecting over the first measurement interval, adjusting size of the uncompressed memory space of the partition's main memory; and subsequent to the adjusting, collecting, over a second measurement interval, statistics on the paging rate at which pages are transferred between the uncompressed memory space and the compressed memory space of the partition's main memory, and referencing the resulting measurement interval statistics in determining an acceptable main memory allocation for the partition.

17. The computer program product of claim 16, wherein the collecting over the first measurement interval, the adjusting, and, the collecting over the second measurement interval, occur during and with minimal impact on normal operation of the partitioned data processing system.

18. The computer program product of claim 16, wherein the computer-readable storage medium readable by the processor and storing instructions for execution by the processor further performs initially splitting the partition's memory into the uncompressed memory space and the compressed memory space, and wherein a page aging out of the uncompressed memory space is compressed and moved to the compressed memory space.

19. The computer program product of claim 16, wherein the adjusting comprises decreasing the size of the uncompressed memory space by reallocating a portion of uncompressed memory space to compressed memory space, and repeating the adjusting and the collecting, over respective measurement intervals, for each adjusted uncompressed memory space size until performance of the partition is negatively impacted by the reallocating of uncompressed memory space to compressed memory space, thereby stressing size of the uncompressed memory space.

20. The computer program product of claim 16, wherein the collecting statistics for the that measurement interval, and the collecting statistics for the second measurement interval, each comprises collecting a paging rate at which pages are compressed for storage in the compressed memory space, collecting a paging rate at which pages are uncompressed and restored from the compressed memory space to the uncompressed memory space, collecting a paging rate at which pages are read from external storage, and collecting a paging rate at which pages are written to external storage, the external storage being external to and separate from the partition's memory.

21. The computer program product of claim 16, wherein the computer-readable storage medium readable by the processor and storing instructions for execution by the processor further performs stepwise repeating of the adjusting and repeating the collecting, over respective measurement intervals, for each adjusted uncompressed memory space size, and producing therefrom a histogram of paging rates for each adjusted uncompressed memory space size, wherein the histograms facilitate determining an amount of uncompressed memory space required by the partition during at least one of normal operation or peak operation thereof.

* * * * *